UNITED STATES PATENT OFFICE.

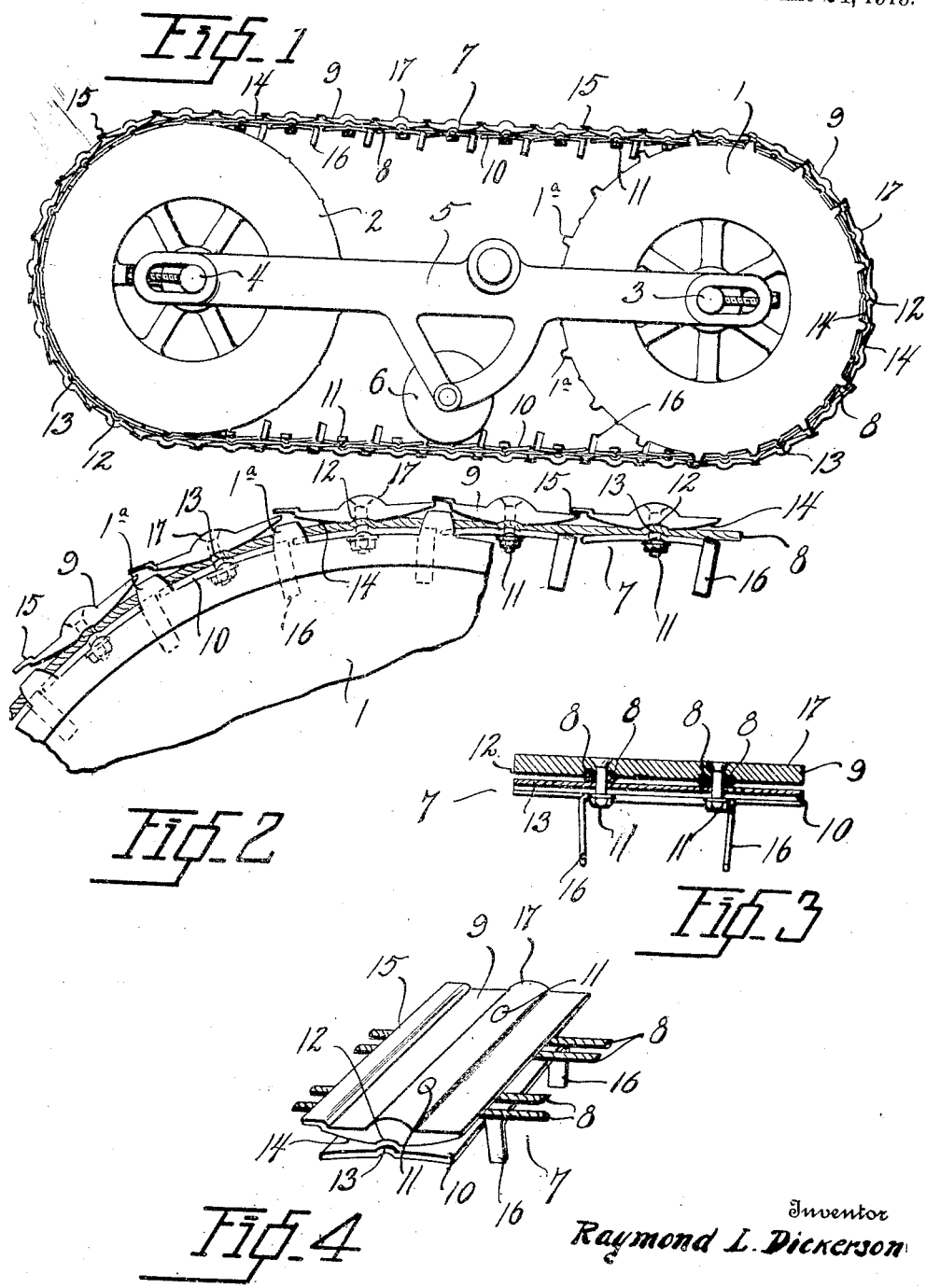

RAYMOND L. DICKERSON, OF SPOKANE, WASHINGTON, ASSIGNOR OF ONE-THIRD TO ANDREW S. JONES, OF SPOKANE, WASHINGTON, AND ONE-THIRD TO W. J. MICHELET, OF PORTLAND, OREGON.

MOTOR-VEHICLE.

1,307,622.

Specification of Letters Patent.

Patented June 24, 1919.

Application filed March 20, 1918. Serial No. 223,510.

*To all whom it may concern:*

Be it known that I, RAYMOND L. DICKERSON, a citizen of the United States, residing at Spokane, in the county of Spokane and State of Washington, have invented certain new and useful Improvements in Motor-Vehicles, of which the following is a specification.

The present invention relates to improvements in motor vehicles, and particularly to traction belts, for automobile trucks or tractors, such belts being known as caterpillar wheels or tracks.

The primary object of the invention is the provision of a flexible, endless, traction belt for use on tractors and trucks that is comparatively inexpensive in cost, but simple in construction, and efficient in operation, and facile in assembling or disassembling for renewal of parts or repairs.

The invention consists essentially in utilizing in conjunction with a plurality of steel cables, or cables of other material, tread plates and gear plates and in certain novel combinations and arrangements of parts for securing the elements of the traction belt, and for guiding the belt on the driving and driven wheels and idlers of the traction device.

In the accompanying drawings one complete example of the physical embodiment of the invention is illustrated according to the best mode so far devised for the practical application of the principles of the invention.

Figure 1 is a side view of a traction device embodying the belt of the invention.

Fig. 2 is an enlarged, fragmentary view, as seen from the opposite side in Fig. 1, showing the relation between the driving wheel and the belt.

Fig. 3 is a transverse view through the belt.

Fig. 4 is a view in perspective showing one of the tread plates and one of the gear plates, and cables, that form a complete link in the belt.

In the preferred form of the invention as illustrated in the drawings I have utilized a driving wheel 1 with its teeth 1ª and a driven wheel 2 on their respective shafts 3 and 4 which are journaled or supported in the frame 5, these elements forming, together with the idle roller 6, the well known driving and supporting wheels of the caterpillar type of traction wheel.

The traction belt, as a whole is indicated by the numeral 7, and comprises a plurality of cables or endless cords 8, here shown as four in number and arranged in pairs, spaced apart, and the outer or tread series of plates 9 and inner or gear series of plates 10, are clamped together by means of the bolts 11. The couple, or pair, of plates 9 and 10 form a link in the flexible belt, the plates of the link being rigidly secured together on the cables, and to further form a stable link, each outer plate 9, on its inner surface, is provided with a recess or seat 12, for the cables, and co-acting with this seat, is a rib 13 projected from the outer face of the inner or gear plate 10, which, when the bolts are tightened, kinks the cables to more securely fasten the plates thereon.

The belts, according to the present invention, are of the required flexibility, and the links of the belt, as usual, overlap, the flange 15 on one tread plate extending over the adjoining tread plate.

To accommodate the teeth of the driving and other wheels, and to guide the belt along its path with relation to the idler rollers, the gear plates are formed with end lugs 16, which project inwardly with relation to the belt, and where these lugs are bent in from the body of the plate a space is left into which the teeth of the driving wheel or gear project. The teeth fit up between the adjoining links of the belt, but do not engage the tread plates of the links. The number 14 indicates a rounded under face of the tread plates which permits the outer plates to have a slight, resilient, movement or rocking motion on the outer face of the gear plates when under load.

In actual use the flexible belt as it moves, endlessly, about the wheels 1 and 2 is guided and held in alinement by the action of the side lugs or flanges 16, and lateral movement of the belt is prevented by the action of the lugs or flanges on the idlers also. To assist in tractive power, exterior ribs or cleats 17 are provided on the tread plates, and this construction also thickens these plates where they are joined with the gear plates to strengthen them.

Claims.

1. A tractor belt comprising a plurality of steel cables arranged in spaced pairs, links secured to said cables each comprising an outer tread plate and an inner gear plate, and said inner plate having an inwardly projecting integral lug cut out from each side of its center to form guides for the belt and to provide spaces for the teeth of a driving wheel.

2. A tractor belt comprising a plurality of steel cables arranged in spaced pairs, a series of overlapping tread plates and a series of gear plates secured together at their transverse axes to form links, each tread plate formed with a rounded face to permit a rocking motion on the adjoining face of the gear plate, and each gear plate formed with end guides flanges and spaces for the reception of the teeth of a driving wheel.

In testimony whereof I affix my signature.

RAYMOND L. DICKERSON.